C. BOYD.
COUPLING.
APPLICATION FILED APR. 29, 1914.
1,134,179. Patented Apr. 6, 1915.
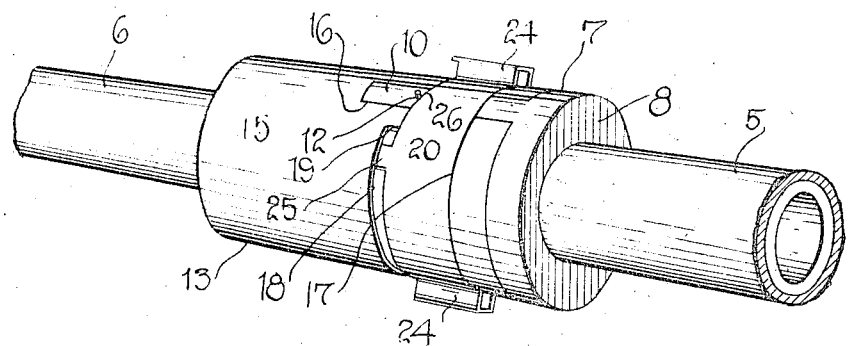
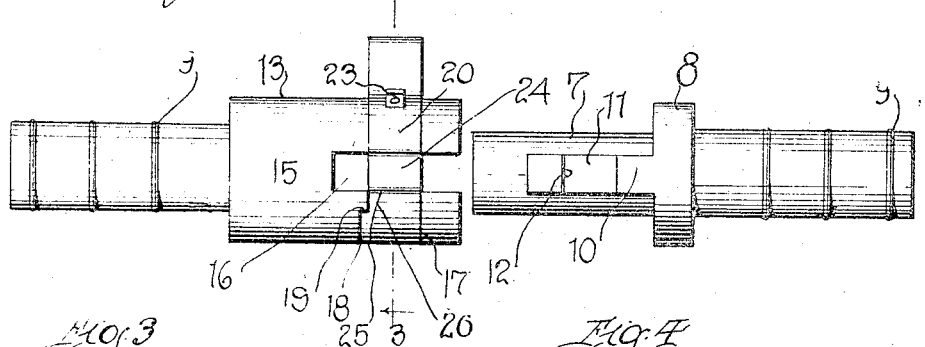
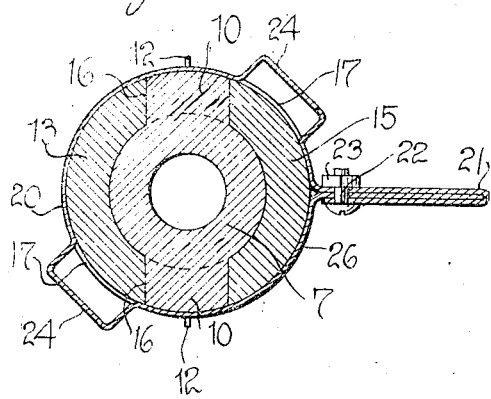
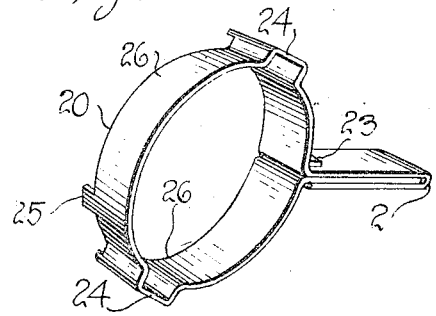
Inventor
CLIFFORD BOYD,
Witnesses
Robert M. Sutphen
A. I. Hud
By Watson E. Coleman
Attorney

UNITED STATES PATENT OFFICE.

CLIFFORD BOYD, OF SUMAS, WASHINGTON, ASSIGNOR OF ONE-HALF TO ERNEST BOYD, OF SUMAS, WASHINGTON.

COUPLING.

1,134,179.

Specification of Letters Patent.

Patented Apr. 6, 1915.

Application filed April 29, 1914. Serial No. 835,233.

*To all whom it may concern:*

Be it known that I, CLIFFORD BOYD, citizen of the United States, residing at Sumas, in the county of Whatcom and State of Washington, have invented certain new and useful Improvements in Couplings, of which the following is a specification, reference being had to the accompanying drawings.

This invention relates to an improved hose coupling and has for its primary object to provide improved means whereby the coupling heads may be easily and expeditiously connected or disconnected.

The invention has for a further object to provide a coupling including male and female coupling heads, and a rotatable locking member mounted upon the female head adapted to coöperate with means on the male coupling head to securely lock said heads together.

The invention has for another object to produce a device of the above character which is extremely simple in its construction, highly serviceable and durable in practical use and may be manufactured at comparatively small cost.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a perspective view illustrating the preferred embodiment of my improved hose coupling; Fig. 2 is a top plan view, the coupling heads being disconnected. Fig. 3 is a transverse section taken on the line 3—3 of Fig. 2; Fig. 4 is a detail perspective view of the locking member.

Referring in detail to the drawing, 5 and 6 respectively designate the two sections of hose to be coupled together. The hose section 5 is provided upon one end with the male coupling head 7 which consists of a tubular shank provided intermediate of its ends with an integral annular flange 8. Upon one side of this flange, the shank of the coupling member is formed with annular peripheral ribs 9 for gripping engagement with the wall of the hose 5. Longitudinally extending oppositely disposed ribs or flanges 10 are integrally formed with the flange 8 and the tubular shank of the coupling member. Each of these longitudinal ribs is provided in its outer face with a recess 11 and at one end of said recess, a stop pin 12 is threaded or otherwise secured in the rib for a purpose which will be hereinafter referred to. Upon the end of the other hose section 6, the female coupling member 13 is arranged, said member including a nipple 14 for insertion in the end of the hose and an enlarged cylindrical body 15. The external diameter of this body is substantially equivalent to that of the flange 8 on the male coupling member. The female coupling member is provided in the wall of its body 15 at diametrically opposite points with the longitudinally extending slots 16 which are designed to receive the longitudinal ribs or flanges 10 of the male member 7. The body 15 is further provided with an annular peripheral groove 17 intersecting the slots 16, and on one side of said body, and at one edge of the groove 17, an arcuate recess 18 is provided forming the opposed stop shoulders 19.

20 designates the locking band which consists of a metal strap bent into substantially circular form and having its ends laterally extended, one of said ends being longer than the other and bent over upon the shorter end as indicated at 21. These lapped extremities of the metal strap are provided with coinciding openings to receive the connecting bolt 22 upon one end of which the nut 23 is threaded. The circular locking band is engaged in the annular peripheral groove 17 of the female coupling member, said band at diametrically opposite points being outwardly offset as at 24, and spaced from the periphery of the coupling member. This band is further provided upon one edge with a lug 25 which is disposed for movement in the arcuate recess 18 formed in the periphery of the body 15 at one side of the annular groove 17.

When it is desired to connect the hose sections, the locking band 20 is turned upon the female section until the lug 25 engages one of the stop shoulders 19, in which position of the band, the offsets 24 thereof will be located in registration with the longitudinal slots 16. The end of the male member is now inserted in the bore of the body 15, the longitudinal ribs 10 moving into the slots 16. When the ends of said ribs engage the inner ends of the slots 16, the recesses 11 in the outer faces of the ribs coincide with the annular groove 17. The locking band 20 is now turned to dispose the portions between the offsets 24 in the recesses 11 of the respective ribs 10, thereby securely locking said ribs against outward longitudinal movement in the slots 16. The pins 12 obviate all liability of disengagement of the locking band from the recesses 11. It will be noted that one edge of the locking band adjacent each of the offsets 24 therein is inclined as shown at 26. These inclined edges of the band riding against the pins 12 as the wider portions of the band move into the recesses 11 forces said band laterally into frictional binding engagement with one edge of the annular groove 17, provided in the periphery of the female coupling member. Thus accidental or unintentional rotation of the locking band upon the connected coupling members is obviated. It will of course be understood that by reversing the above described operation, the coupling heads may be readily disconnected.

From the foregoing description taken in connection with the accompanying drawing, it is believed that the construction, manner of operation and several advantages of my invention will be clearly and fully understood. The device is very serviceable in practical use and enables the hose sections to be very easily and quickly connected or disconnected. A hose or pipe coupling constructed in accordance with my invention, is highly efficient and reliable and will securely lock the coupling heads together against possibility of accidental disconnection. As the device embodies but very few parts in its construction, which are all of simple form, it will be further appreciated that the same is very durable and may be produced at small manufacturing cost.

While I have shown and described the preferred construction and arrangement of the several elements, it will be understood that the invention is susceptible of considerable modification therein and I therefore reserve the privilege of resorting to all such legitimate changes as may be fairly embodied within the spirit and scope of the invention as claimed.

Having thus described the invention, what is claimed is:

A coupling comprising male and female coupling members, said female member being provided with diametrically opposed longitudinal slots and a circumferential groove intersecting said slots, said female member also having a circumferentially extending recess in its periphery communicating with said groove, said male member being provided with longitudinal ribs to be received in the respective slots and said ribs having recesses in their outer faces to register with said groove, an annular locking band movably mounted in said groove and flush with the periphery of the female member, pins secured in the recesses of the ribs on the male member with which said band is adapted to coöperate, whereby the band when turned, is shifted laterally in the recesses of said ribs and into binding engagement with one edge thereof and with the corresponding edge of the groove in said female member, and a lug projecting from one edge of said band and movable in the circumferential recess in the female member, said lug being adapted to engage the end walls of said recess whereby the turning movement of the band is limited.

In testimony whereof I hereunto affix my signature in the presence of two witnesses.

CLIFFORD BOYD.

Witnesses:
BEATRICE M. SORENSEN,
W. G. VON WEEL.